June 26, 1962     R. E. HARRAH     3,040,712
CYLINDER, PISTON AND ROD ASSEMBLY
Filed April 17, 1959
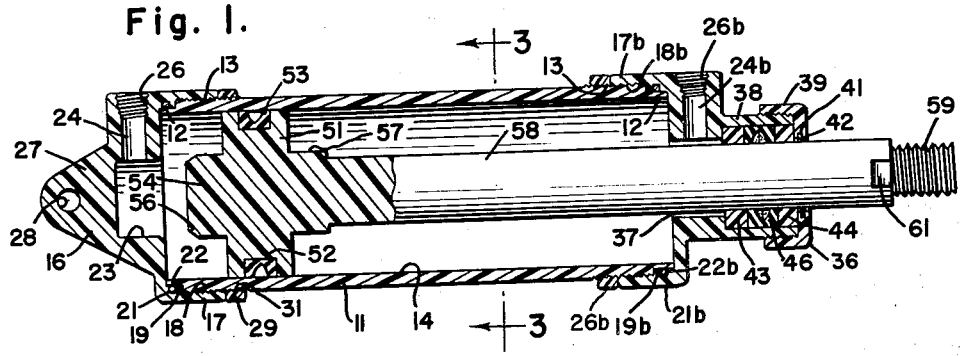
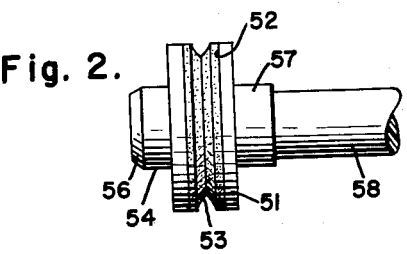
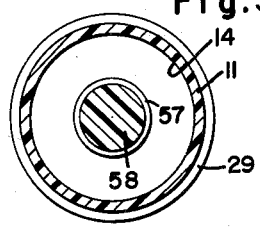
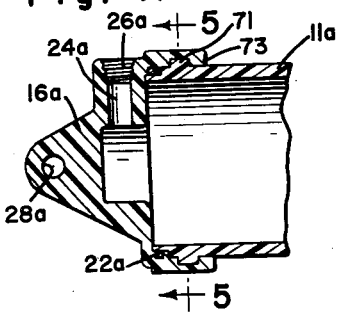
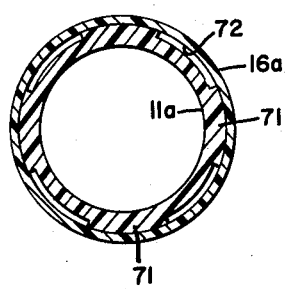
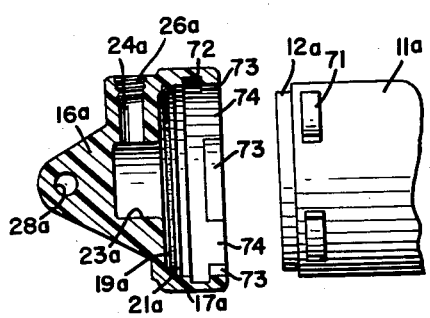
INVENTOR.
Robert E. Harrah
BY 3,040,712
Patented June 26, 1962

3,040,712
CYLINDER, PISTON AND ROD ASSEMBLY
Robert E. Harrah, Willits, Calif., assignor to Firco, Inc., Willits, Calif., a corporation of California
Filed Apr. 17, 1959, Ser. No. 807,202
6 Claims. (Cl. 121—38)

This invention relates to a new and improved cylinder, piston and rod assembly for pneumatic and hydraulic cylinders in which the cylinder is molded from non-metallic plastic material and little or no machine work is required and, further, in which the piston and rod are molded and little or no machine work is required. Preferably, the parts are made of a glass fibre impregnated resin or other suitable non-metallic material.

One of the features of the invention is the fact that it will withstand extremely high pressures, such as in the neighborhood of 5,000 p.s.i.

A further feature of the invention is the fact that construction of the parts of non-metallic materials eliminates the hazard of sparks, which is of particular importance in use on aircraft and missiles.

A still further factor of the invention is the low weight factor, which is likewise of importance in aircraft and missile use. The light weight of the plastic results in a device weighing approximately one-quarter that of metal cylinders of equal size, pressure and capacity.

Molding the piston and rod in a single piece is advantageous in that fastening of the two pieces together is unnecessary, and the possibility of the two pieces becoming separated is eliminated.

Inasmuch as the material of concentration is preferably plastic, the device is non-magnetic, rust proof, and a non-conductor of electricity, all of which are desirable features in a cylinder construction.

A modified form of the invention employs a particular means for locking the heads on to the cylinder by means of a bayonet slot construction, which is advantageous in that the heads may be rapidly applied. Further, by using a plurality of lugs on the cylinder and a plurality of sockets on the heads, the head may be adjusted in a plurality of positions, allowing the port to be directed in different directions.

Other objects of the present invention will become apparent upon reading the following specification and referring to the accompanying drawings in which similar characters of reference represent corresponding parts in each of the several views.

In the drawings:

FIG. 1 is a longitudinal, sectional view through the cylinder and piston.

FIG. 2 is a side elevational view of the piston and a portion of its rod.

FIG. 3 is a transverse sectional view taken substantially along the line of 3—3 of FIG. 1.

FIG. 4 is a fragmentary, longitudinal, sectional view of a modification.

FIG. 5 is a transverse sectional view taken substantially upon the line of 5—5 of FIG. 4.

FIG. 6 is an exploded view of the modification of FIG. 4, showing the head of the cylinder in section and a portion of the barrel of the cylinder in elevation.

The present invention employs a cylinder of the type used for air or hydraulic fluid, operating at very high pressures such as up to 5,000 p.s.i. Preferably, each of the parts is formed of a plastic material such as fiberglass impregnated with resin and formed by a molding process. The barrel 11 of the cylinder is preferably cylindrical in shape and is formed at each end with a neck 12 of restricted external diameter. Immediately inward of the necked portions 12 are external threads 13 which are molded at the time that the barrel itself is molded. The internal bore 14 of the barrel 11 is likewise molded, and accurate machining thereof is unnecessary. The left hand or blind head cap 16 is formed with a collar 17, having internal threads 18 which engage threads 13. Immediately inwardly of the threaded portion 18 is an annular, internal projection 19 which fits into the neck 12. To effect a tight seal, a circumferential groove 21 is formed in projection 19 to receive an O ring which effects a tight seal against the necked portion 12 of barrel 11. An internal cavity 23 is formed in the interior of cap 16 for the purpose of receiving the nose of the piston hereinafter described. A radial duct or port 24 extends from cavity 23 to the exterior of the cap and its outer end is formed with internal threads 26 to receive a fitting (not shown) to which the fluid line is attached. The end of cap 16 is formed with a flattened tongue 27, which has an aperture 28 to receive a clevis pin (not shown). The cap 16 is held in place by threads 13 anad 18. A lock ring 29 having internal threads 31 is used to secure the cap 16 on the barrel 11. At the end of barrel 11 opposite cap 16 is the pressure head 36 formed with a collar 17b similar to collar 17, which is internally threaded with threads 18b fitting over the threads 13 on the end of barrel 11. An annular, inward extension 19b at the base of collar 17b is formed with a circumferential groove 21b to receive an O ring 22b, which seals against the neck 12 at the right hand end of barrel 11. An oversized, cushioning cavity 37 is formed in head 36 (i.e., the diameter of cushioning cavity 37 is greater than that of the piston rod hereinafter described) to receive one of the cushion noses of the piston rod. Radial duct or port 24b extends from cushion cavity 37 to the exterior of head 36, and its outer end is formed with internal threads 26b to receive a fitting (not shown) by which the fluid line is connected into the cylinder.

Extending longitudinally from head 36 is a bonnet 38, having an internal diameter substantially greater than that of cavity 37. The outer end of bonnet 38 is formed with external grooves to receive packing nut 39. A molded wiper groove 41 is formed in nut 39 to receive a felt wiper 42 which bears against the stem of the piston rod. Interiorly of bonnet 38 are inner and outer rod guides 43 and 44, respectively, which hold the piston rod in alignment. Between guides 43 and 44 is piston rod packing 46.

The piston 51 has an external diameter approximately equal to the diameter of bore 14. A packing groove 52 is cut into the outside of piston 51 to receive piston packing 53 which seals against the bore 14. The left-hand end of piston 51 is formed with a longitudinally extending front cushion nose 54 dimensioned to fit into the cavity 23. The corners of the nose 54 are formed with a chamfer 56 to assist the entry of the nose into its cavity. Immediately to the right of the piston 51 is an enlarged rear nose portion 57 dimensioned to fit into cavity 37. Beyond the nose 57 is the piston rod 58 of a lesser diameter than nose 57 and which fits through guides 43 and 44 with the packing 46 sealing against the rod 58. The exterior of rod 58 is formed with threads 59. Flats 61, for reception of a wrench, are formed on the end of rod 58.

In the modification of FIGS. 4 to 6, inclusive, the threads 13 and 18 of the modification of FIGS. 1 to 3 are eliminated. Instead, external lugs 71 are formed on the exterior of the barrel 11a. In the drawings four lugs 71 are shown, each having an arcuate length of about 45 degrees. The cap 16a is formed with an internal groove 72, having diameter approximately equal to twice the radius between the exterior of lugs 71 and the axis of the cylinder. Arcuate gaps 74 are formed in the in-turned rim 73 of the cap 16a. The number and arcuate length of the gaps 74 correspond to that of lugs 71. The other portions of the cap 16a and barrel 11a are essentially the same as the corresponding portions of the modification of FIGS. 1 to 3, and bear similar reference numerals followed by the subscript "a."

In assembly of the cap 16a and the barrel 11a, the lugs 71 are inserted through the gaps 74, and thereupon the cap 16a is twisted a distance of less than 45 degrees, causing the lugs 71 to seat behind the rim 73. The use of four lugs 71 permits the cap 16a to be connected in any of four positions so that the port 24a may extend in any of four directions 90 degrees apart.

Although the foregoing invention has been described in some detail by way of illustration and example for purposes of clarity of understanding, it is understood that certain changes and modifications may be practiced within the spirit of the invention and scope of the appended claims.

What is claimed is:

1. A hydraulic cylinder and piston combination comprising a barrel having a cylindrical interior bore, a first cap on one end of said barrel, a second cap on the end of said barrel opposite said first cap, each said cap having an integral collar fitting over the adjacent end of said barrel, cooperative means on said collars and barrel to detachably retain said caps in position, each said cap being formed with an internal cavity substantially centrally disposed and a substantially radial port for fluid extending from said cavity out to the exterior of said cap, said second cap being centrally apertured, and a piston reciprocable in said barrel, said piston having an integral rod extending out through the aperture in said second cap, said piston having integral first and second noses projecting axially in opposite directions from said piston and shaped to fit within said cavities in said first and second caps, respectively, a bonnet extending axially on the outer end of said second cap in alignment with the aperture in said second cap, a pair of rod guides within said bonnet and engaging said rod to hold said rod in alignment, said rod guides comprising annular discs fitting inside said bonnet and around said rod and spaced apart along said rod, packing inside said bonnet between said guides, and an apertured packing nut on said bonnet, said piston and rod, said barrel, and each of said caps being integrally molded of glass fibre reinforced plastic material, said cylinder and piston combination being fabricated entirely from non-metallic materials.

2. The combination of claim 1 in which said cooperative means comprises external threads on each end of said barrel and matching internal threads on said collars.

3. The combination of claim 1 in which said cooperative means comprises lugs on the exterior of said barrel adjacent but spaced inwardly of the ends on said barrel, and an inturned flange on the end of each collar, said flange being formed with gaps corresponding in number, position and length with said lugs.

4. A hydraulic cylinder and piston combination comprising a barrel having a cylindrical interior bore, a first cap on one end of said barrel, a second cap on the end of said barrel opposite said first cap, each said cap having an integral collar fitting over the adjacent end of said barrel, cooperative means on said collars and barrel to detachably retain said caps in position, each said cap being formed with an internal cavity substantially centrally disposed and a substantially radial port for fluid extending from said cavity out to the exterior of said cap, said second cap being centrally apertured, at least one end of said barrel being necked-in, and the adjacent cap being formed with an annular internal projection fitting into said necked-in portion in the assembled position of said combination, and a piston reciprocable in said barrel, said piston having an integral rod extending out through the aperture in said second cap, said piston having integral first and second noses projecting axially in opposite directions from said piston and shaped to fit within said cavities in said first and second caps, respectively, and a packing nut on said second cap sealing around said rod, said piston and rod, said barrel, and each of said caps being integrally molded in substantially completed form of a plastic material resistant to high fluid pressures, said cylinder and piston combination being fabricated entirely from non-metallic materials.

5. The combination of claim 4 in which said projection is formed with a circumferential groove and which further comprises a sealing ring in said groove sealing against the necked-in portion of said barrel.

6. A hydraulic cylinder comprising a barrel open at both ends having a cylindrical interior bore, a first cap on one end of said barrel, a second cap on the end of said barrel opposite said first cap, each said cap having an integral collar fitting over the adjacent end of said barrel, lugs on the exterior of said barrel adjacent but spaced inwardly of the ends of said barrel, an inturned flange on the end of each said collar, said flanges being formed with gaps corresponding in number, position and length with said lugs, said second cap being centrally apertured, a bonnet extending axially on the outer end of said second cap in alignment with the aperture in said second cap, rod guides in said bonnet, packing in said bonnet, an apertured packing nut on said bonnet, said barrel and each of said caps being integrally molded of glass fibre reinforced plastic material, at least one end of said barrel being necked-in and the adjacent cap being formed with an annular internal projection fitting into said necked-in portion, said projection being formed with a circumferential groove, and a sealing ring on said groove sealing against the necked-in portion of said barrel, said hydraulic cylinder being fabricated entirely from non-metallic materials.

References Cited in the file of this patent

UNITED STATES PATENTS

| 1,547,285 | Armstrong | July 28, 1925 |
| 2,045,024 | Renken | June 23, 1936 |
| 2,145,384 | Allin | Jan. 31, 1939 |
| 2,230,286 | Cotner | Feb. 4, 1941 |
| 2,349,170 | Jackman | May 16, 1944 |
| 2,376,566 | Woodling | May 22, 1945 |
| 2,429,426 | Phillips | Oct. 21, 1947 |
| 2,486,615 | Schreiber | Nov. 1, 1949 |
| 2,490,553 | Smith | Dec. 6, 1949 |
| 2,681,043 | Irwin | June 15, 1954 |
| 2,826,467 | Ballard | Mar. 11, 1958 |
| 2,838,300 | Gray | June 10, 1958 |
| 2,842,284 | Flick | July 8, 1958 |
| 2,886,034 | Robinson et al. | May 12, 1959 |
| 2,907,330 | Laub | Oct. 6, 1959 |

FOREIGN PATENTS

| 429,769 | France | Sept. 30, 1911 |
| 620,855 | France | Apr. 30, 1927 |